United States Patent
Byun

(10) Patent No.: US 10,168,952 B2
(45) Date of Patent: Jan. 1, 2019

(54) MEMORY SYSTEM AND OPERATING METHOD THEREOF USING SEGMENT LISTS

(71) Applicant: SK hynix Inc., Gyeonggi-do (KR)

(72) Inventor: Eu-Joon Byun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 298 days.

(21) Appl. No.: 15/096,119

(22) Filed: Apr. 11, 2016

(65) Prior Publication Data
US 2017/0139645 A1    May 18, 2017

(30) Foreign Application Priority Data

Nov. 13, 2015    (KR) ................ 10-2015-0159580

(51) Int. Cl.
*G06F 3/06* (2006.01)
*G06F 12/02* (2006.01)
*G06F 12/0802* (2016.01)
*G06F 12/1018* (2016.01)

(52) U.S. Cl.
CPC ............ *G06F 3/0659* (2013.01); *G06F 3/061* (2013.01); *G06F 3/064* (2013.01); *G06F 3/0619* (2013.01); *G06F 3/0679* (2013.01); *G06F 3/0685* (2013.01); *G06F 12/0246* (2013.01); *G06F 12/0802* (2013.01); *G06F 12/1018* (2013.01); *G06F 2212/1016* (2013.01); *G06F 2212/60* (2013.01); *G06F 2212/7201* (2013.01); *G06F 2212/7203* (2013.01)

(58) Field of Classification Search
CPC ...... G06F 3/0626; G06F 3/061; G06F 3/0616; G06F 3/064; G06F 3/065; G06F 3/0659; G06F 3/0608; G06F 3/0673; G06F 12/0253; G06F 12/0246; G06F 12/0802; G06F 12/1009; G06F 12/1018; G06F 2212/1016; G06F 2212/60; G06F 2212/1056; G06F 2212/651; G06F 2212/657; G06F 2212/7201; G06F 2212/7203; G06F 3/0679; G06F 3/0619; G06F 3/0685; G06F 2212/1018; G06F 2212/76; G06F 2212/201; G11C 16/10; G11C 16/0483
USPC ................................ 711/103, 154, 205–209
See application file for complete search history.

(56) References Cited

U.S. PATENT DOCUMENTS

| | | | |
|---|---|---|---|
| 2014/0223079 A1* | 8/2014 | Zhang | G06F 12/0246 711/103 |
| 2014/0281145 A1* | 9/2014 | Tomlin | G06F 12/0246 711/103 |
| 2016/0232088 A1* | 8/2016 | Mohan | G06F 12/0246 |

FOREIGN PATENT DOCUMENTS

| KR | 1020130114233 | 10/2013 |
|---|---|---|
| KR | 101384435 | 4/2014 |
| KR | 101392174 | 5/2014 |

\* cited by examiner

*Primary Examiner* — Shane D Woolwine
(74) *Attorney, Agent, or Firm* — IP & T Group LLP

(57) ABSTRACT

A memory system may include a memory device including a plurality of memory blocks each having a plurality of pages suitable for storing data requested from a host, and a controller including a memory, and suitable for storing write data corresponding to a write command received from the host in a first memory block of the memory blocks, storing first and second map data corresponding to the write data written to the first memory block in a second memory block of the memory blocks, and storing a segment list for first segments of the first map data in the memory.

20 Claims, 12 Drawing Sheets

MEMORY SYSTEM AND OPERATING METHOD THEREOF USING SEGMENT LISTS

CROSS-REFERENCE TO RELATED APPLICATIONS

The present application claims priority of Korean Patent Application No. 10-2015-0159580, filed on Nov. 13, 2015, the disclosures of which are incorporated herein in their entirety by reference.

BACKGROUND

1. Field

Exemplary embodiments of the present invention relate to a memory system, and more particularly, to a memory system for processing data to a memory device and an operating method thereof.

2. Description of the Related Art

The computer environment paradigm has shifted to ubiquitous computing systems that may be used anywhere and at any time. As a result, use of portable electronic devices, such as mobile phones, digital cameras, and notebook computers continues to increase rapidly. Portable electronic devices generally use a memory system having one or more semiconductor memory devices for storing data. Semiconductor memory devices referred to herein simply as memory devices may be used as a main memory device or an auxiliary memory device of a portable electronic device.

Semiconductor memory devices provide excellent stability, durability, high information access speed, and low power consumption, since unlike other types of data storage devices they have no moving parts. Examples of semiconductor memory devices having such advantages include universal serial bus (USB) memory devices, memory cards having various interfaces, and solid state drives (SSD). Continuous consumer demand for higher capacity, faster portable electronic devices creates the need for improved, faster, and more reliable memory systems.

SUMMARY

Various embodiments of the present disclosure are directed to a memory system capable of rapidly and stably processing data to a memory device, and an operating method thereof.

In an embodiment of the present disclosure, a memory system may include: a memory device comprising a plurality of memory blocks suitable for storing data received from a host; and a controller comprising a controller memory, the controller being suitable for storing: write data corresponding to a write command received from the host in a first memory block of the plurality memory blocks; first and second map data corresponding to the write data written to the first memory block in a second memory block of the plurality memory blocks; and a segment list for a plurality of first segments of the first map data in the memory.

The controller may store second segments of the second map data in the memory, and sort the second segments stored in the memory for each of the first segments.

The controller may build the segment list by forming one or more of an entry, a tree, a link, and a hash table between the sorted second segments, for each of the first segments.

When updating the first map data stored in the second memory block, the controller may check a third segment which needs to be updated among the first segments of the first map data, through the segment list.

The controller may load the third segment to the memory, and then check the third segment and a corresponding one of the sorted second segments for the third segment in the segment list.

The controller may update the corresponding one of the sorted second segments in the third segment loaded to the memory, and then store the third segment in the second memory block.

The first segments in the segment list may have a logical address offset therebetween, and the controller may sort the second segments for each of the first segments, based on the logical address offset.

The controller may sort the second segments for each of the first segments, in a logical address sequence.

The first map data may include logical information corresponding to a data storage to the first memory block, and the second map data may include physical information corresponding to the data storage to the first memory block.

The controller may check logical information and physical information on read data corresponding to a read command received from the host, through the segment list.

In an embodiment of the present disclosure, an operating method of a memory system may include: receiving a write command from a host, for a plurality of memory blocks of a memory device; and storing write data corresponding to the write command in a first memory block of the memory blocks, storing first and second map data corresponding to the write data written in the first memory block into a second memory block of the memory blocks, and storing a segment list for first segments of the first map data in a memory included in a controller of the memory device.

The storing of the segment list may include storing second segments of the second map data in the memory, and sorting the second segments stored in the memory for each of the first segments.

The storing of the segment list may further include building the segment list by forming one or more of an entry, a tree, a link, and a hash table between the sorted second segments, for each of the first segments.

The operating method may further include updating the first map data stored in the second memory block by checking a third segment which needs to be updated among the first segments of the first map data, through the segment list.

The updating of the first map data may include loading the third segment to the memory, and checking the third segment and a corresponding one of the sorted second segments for the third segment in the segment list.

The updating of the first map data may further include updating the corresponding one of the sorted second segments in the third segment loaded to the memory, and then storing the third segment into the second memory block.

The first segments in the segment list may have a logical address offset therebetween, and the second segments may be sorted for each of the first segments, based on the logical address offset.

The second segments may be sorted for each of the first segments, in a logical address sequence.

The first map data may include logical information corresponding to a data storage to the first memory block, and the second map data may include physical information corresponding to the data storage to the first memory block.

The operating method may further include: checking logical information and physical information on read data corresponding to a read command received from the host; and reading the read data from the first memory block, using the checked logical information and physical information.

DETAILED DESCRIPTION

Figure 1:
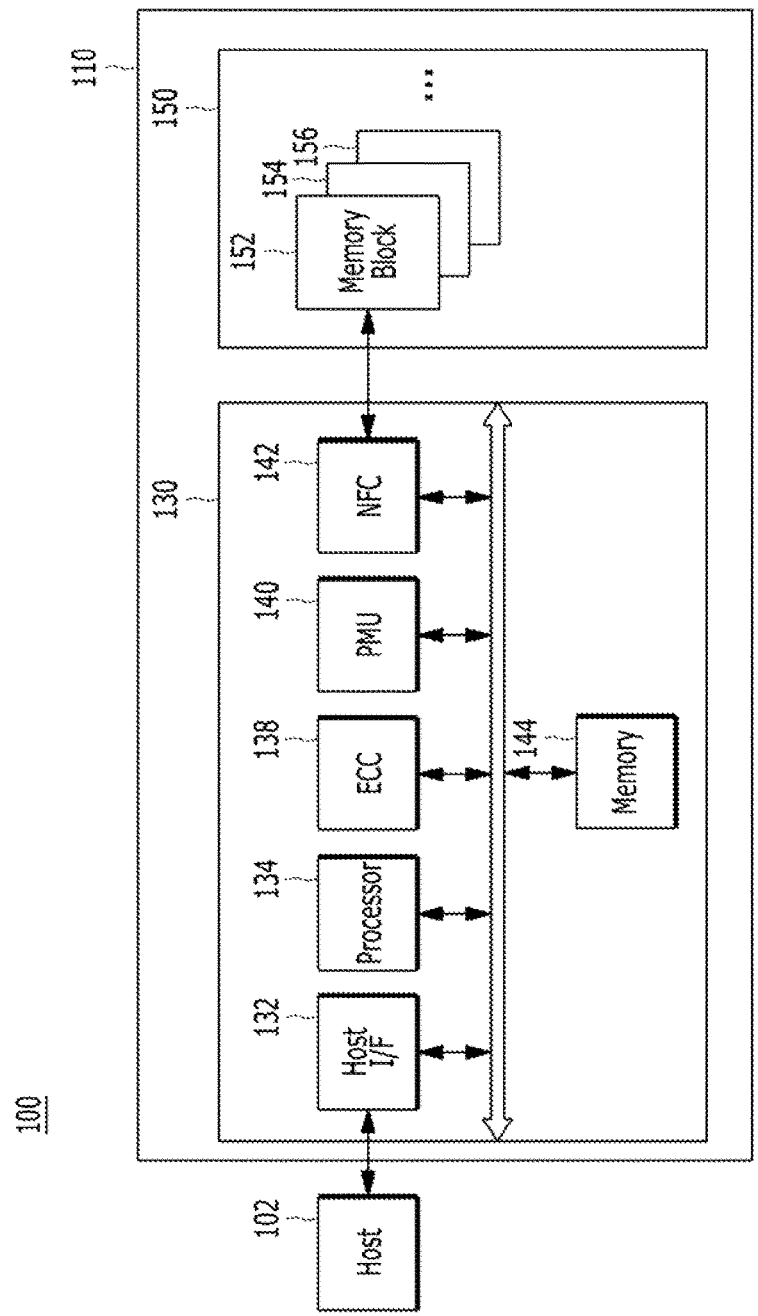
FIG. 1 is a diagram illustrating a data processing system including a memory system comprising a memory device and a controller, according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the invention to those skilled in the relevant art. Throughout the disclosure, like reference numerals refer to like parts throughout the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically stated otherwise. It should be readily understood that the meaning of "on" and "over" in the present invention should be interpreted in the broadest manner so that "on" means not only "directly on" but also "on" something with an intermediate feature(s) or a layer(s) therebetween, and that "over" means not only directly on top but also on top of something with an intermediate feature(s) or a layer(s) therebetween. When a first layer is referred to as being "on" a second layer or "on" a substrate, it may not only refer to a case where the first layer is formed directly on the second layer or the substrate but may also refer to a case where a third layer exists between the first layer and the second layer or the substrate.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be further understood that the terms "comprises", "comprising", "includes", "including," "has," or "having" when used in this specification, specify the presence of the stated features, integers, operations, elements, and/or components, but do not preclude the presence or addition of one or more other non-stated features, integers, operations, elements, components, and/or combinations thereof. As used herein, the term "and/or" includes any and all combinations of one or more of the associated listed items.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

Hereinafter, the various embodiments of the present invention will be described in more detail with reference to the drawings.

FIG. 1 is a block diagram illustrating a data processing system including a memory system, according to an embodiment of the present invention.

Referring to FIG. 1, a data processing system 100 may include a host 102 and a memory system 110.

The host 102 may be or include, for example, a portable electronic device, such as a mobile phone, an MP3 player, a laptop computer and the like. The host 102 may also be or include, for example, an electronic device, such as a desktop computer, a game player, a TV, a projector and the like.

The memory system 110 may operate in response to a request from the host 102. For example, the memory system 110 may store data to be accessed by the host 102. The memory system 110 may be used as a main memory system of the host 102. The memory system may be used as an auxiliary memory system of the host 102.

The memory system 110 may be or include any one of various kinds of storage devices, according to the protocol of a host interface to be coupled electrically with the host 102. The memory system 110 may be or include any one of various kinds of storage devices, such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be or include a volatile memory device, such as a dynamic random access memory (DRAM), a static random access memory (SRAM) and the like. The storage devices for the memory system 110 may be or include a nonvolatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 and a controller 130. The memory device may store data to be accessed by the host 102. The controller 130 may control the storage of data in the memory device 150.

The controller 130 and the memory device 150 may be integrated into a single semiconductor device. For instance, the controller 130 and the memory device 150 may be integrated into a single semiconductor device configured as a solid state drive (SSD). When the memory system 110 is configured as a SSD, the operation speed of the host 102 that is coupled electrically with the memory system 110 may be significantly increased.

The controller 130 and the memory device 150 may be integrated into a single semiconductor device configured as a memory card. The controller 130 and the memory card 150 may be integrated into a single semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

For another instance, the memory system 110 may be or include a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102 during a write operation. The memory device 150 may provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) may be coupled electrically.

The memory device 150 may retain stored data when power supply to the device is interrupted or turned off. The memory device 150 may be a nonvolatile memory device, for example, a flash memory. The flash memory may have a three-dimensional (3D) stack structure. A 3D stack structure of a memory device 150 is described later in more detail with reference to FIGS. 2 to 11.

The controller 130 may control the memory device 150 in response to a request from the host 102. The controller 130 may control the flow of data between the memory device 150 and the host 102. For example, the controller 130 may transmit data read from the memory device 150 to the host 102, and or transmit data provided from the host 102 to the memory device 150 to be stored therein. To this end, the controller 130 may control the overall operations of the memory device 150, such as, for example, read, write, program and erase operations.

In the example of FIG. 1, the controller 130 may include a host interface unit 132, a processor 134, an error correction code (ECC) unit 138, a power management unit 140, a NAND flash controller 142, and a memory 144.

The host interface unit 132 may process commands and or data provided from the host 102. The host interface unit 132 may communicate with the host 102 through at least one of various interface protocols, such as for example, universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and the like. The host interface unit 132 may include all circuits, systems, or devices as may be needed for the interface between the host 102 and the controller 130.

The ECC unit 138 may detect and or correct errors in the data read from the memory device 150 during a read operation. For example, the ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include all circuits, systems, or devices as may be needed for the error correction operation.

The PMU 140 may provide and or manage power for the controller 130, that is, power for the component elements included in the controller 130. Any suitable power module may be used.

The NFC 142 may serve as a memory interface between the controller 130 and the memory device 150 for allowing the controller 130 to control the memory device 150, for example, in response to a request from the host 102. The NFC 142 may generate control signals for the memory device 150 and process data under the control of the processor 134 when the memory device 150 is a flash memory and, for example, when the memory device 150 is a NAND flash memory. Although the Interface unit 142 in the embodiment of FIG. 1 is an NFC unit suitable for interfacing a NAND flash memory with the controller the invention is not limited in this way. The memory interface unit 142 may be any suitable memory interface unit suitable for interfacing the memory device 150 to the controller. It is noted that the specific architecture and functionality of the interface unit 142 may vary depending upon the type of the memory device employed.

The memory 144 may serve as a working memory of the memory system 110 and the controller 130, and store data for driving the memory system 110 and or the controller 130. The controller 130 may control the memory device 150 in response to a request from the host 102. For example, as discussed above, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be or include any suitable memory device. The memory 144 may be a volatile memory. The memory 144 may be or include a static random access memory (SRAM). The memory 144 may be or include a dynamic random access memory (DRAM). The memory 144 may include any suitable architecture. For example, the memory 144 may include a program memory, a data memory, a write buffer, a read buffer, a map buffer, and the like all of which are well known in the art.

The processor 134 may control general operations of the memory system 110. The processor 134 may control a write or a read operation for the memory device 150, in response to a write or a read request from the host 102. The processor 134 may be or comprise any suitable processor.

The processor 134 may drive firmware, which is referred to as a flash translation layer (FTL), to control the general operations of the memory system 110. The processor 134 may be or include a microprocessor. Any suitable microprocessor may be used. The processor 134 may be or include a central processing unit (CPU).

A bad block management unit (not shown) may be included in the processor 134, for performing bad block management of the memory device 150. The bad block management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management operation, the data of the program-failed memory block or the bad memory block may be programmed into a new memory block. Bad blocks due to a program fall may seriously deteriorate the utilization efficiency of the memory device 150 and the reliability of the memory system 100. Thus, reliable bad block management may be included in the processor 134 for resolving these concerns.

Figure 2:
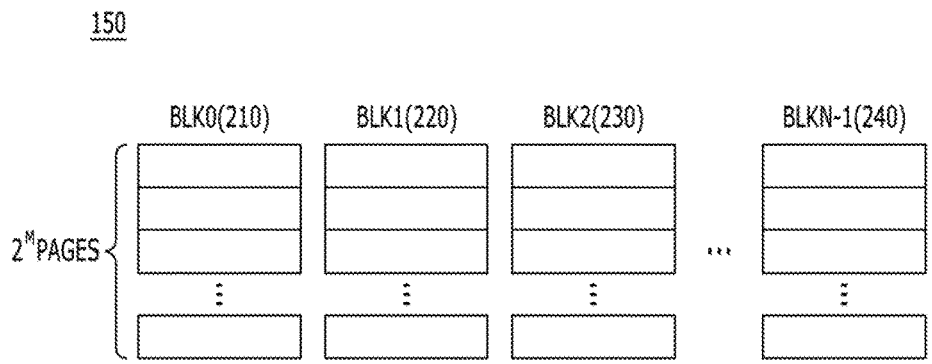
FIG. 2 is a diagram illustrating an example configuration for the memory device of FIG. 1.

FIG. 2 illustrates a memory device 150 of the memory system 110 of FIG. 1, according to an embodiment of the invention.

Referring to FIG. 2, the memory device 150 may include a plurality of memory blocks, for example, zeroth to (N−1)$^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines may be coupled electrically.

The memory blocks may be single level cell (SLC) memory blocks or multi-level cell (MLC) memory blocks, according to the number of bits which may be stored or expressed in each memory cell contained in the memory blocks. An SLC memory block may include a plurality of pages including a plurality of memory cells, each memory cell being capable of storing 1-bit data. An MLC memory block may include a plurality of pages including a plurality of memory cells, each memory cell being capable of storing multi-bit data, for example, two or more-bit data. An MLC memory block including a plurality of pages which are implemented with memory cells that are each capable of storing 3-bit data may be referred to as a triple level cell (TLC) memory block.

Each of the plurality of memory blocks 210 to 240 may store the data provided from the host device 102 during a write operation, and may provide stored data to the host 102 during a read operation.

Figure 3:
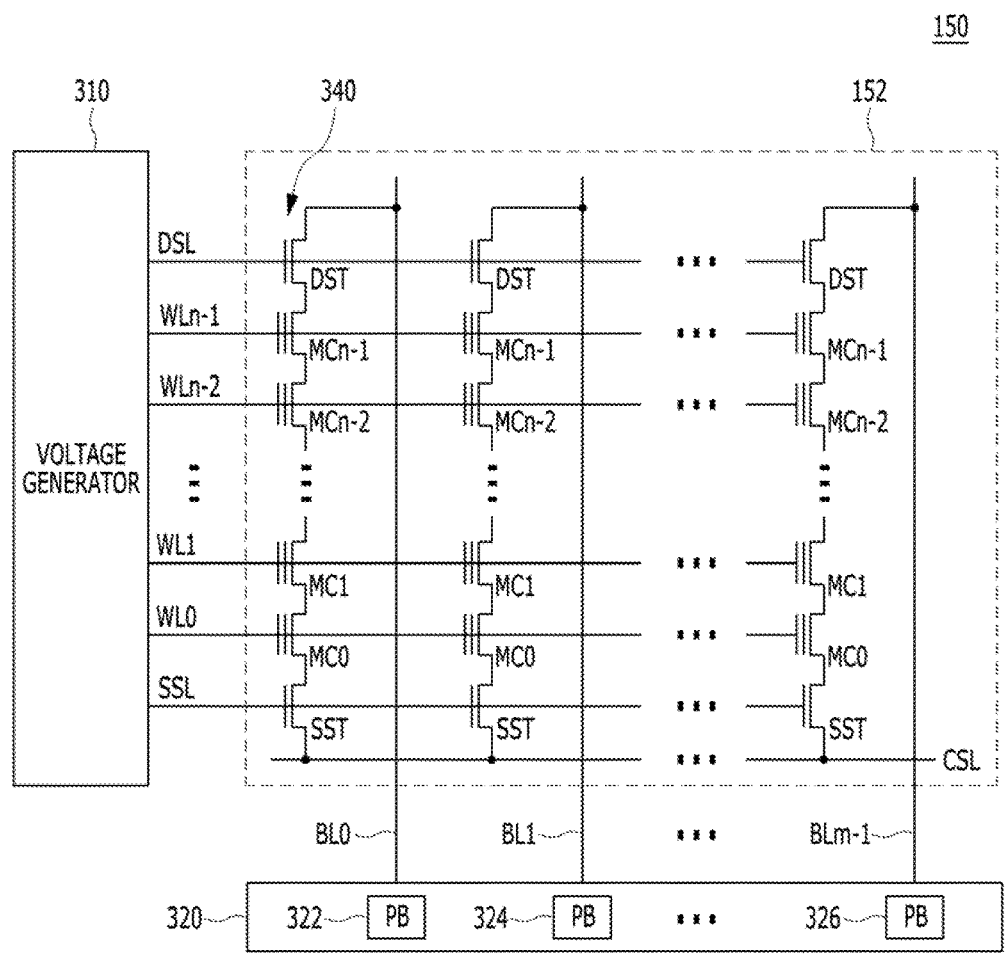
FIG. 3 is a circuit diagram for one of the memory blocks of the memory device of FIG. 1.

FIG. 3 is a circuit diagram illustrating one of the plurality of memory blocks 152 to 156 shown in FIG. 1.

Referring to FIG. 3, a memory block 152 of the memory device 150, for example memory block 152, may include a plurality of cell strings 340 which are coupled electrically to respective bit lines BL0 to BLm−1. Each cell string 340 may include at least one drain select transistor DST, at least one source select transistor SST and a plurality of memory cells or a plurality of memory cell transistors MC0 to MCn−1 coupled electrically in series between the drain and source select transistors DST and SST. The respective memory cells MC0 to MCn−1 may be configured by single level cells (SLC) each of which stores data information of a single bit. The respective memory cells MC0 to MCn−1 may be configured by multi-level cells (MLC) each of which stores data information of a plurality of bits. The strings 340 may be coupled electrically to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, the memory block 152 which is configured by NAND flash memory cells, it is to be noted that the memory block 152 of the memory device 150 is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 corresponding to respective columns (or bit lines) or pairs of columns (or pairs of bit lines). A plurality of latches (not shown) may also be included in each of the page buffers 322, 324 and 326.

FIGS. 4 to 11 are schematic diagrams illustrating various embodiments of a memory device 150.

Figure 4:
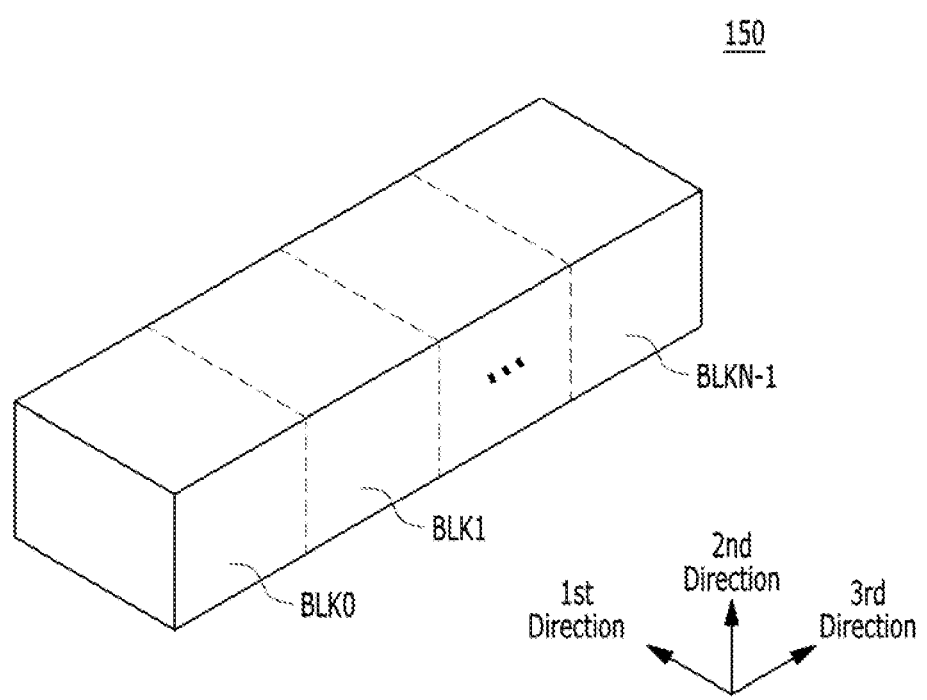
FIGS. 4 to 11 are diagrams illustrating example structures for the memory device of FIG. 1.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN−1. Each of the memory blocks BLK0 to BLKN−1 may be realized in a three-dimensional (3D) structure or a vertical structure. The respective memory blocks BLK0 to BLKN−1 may include structures extending in first to third directions, for example, an x-axis, a y-axis, and a z-axis direction.

The respective memory blocks BLK0 to BLKN−1 may include a plurality of NAND strings NS extending in the second direction. The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. Namely, the respective memory blocks BLK0 to BLKN−1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
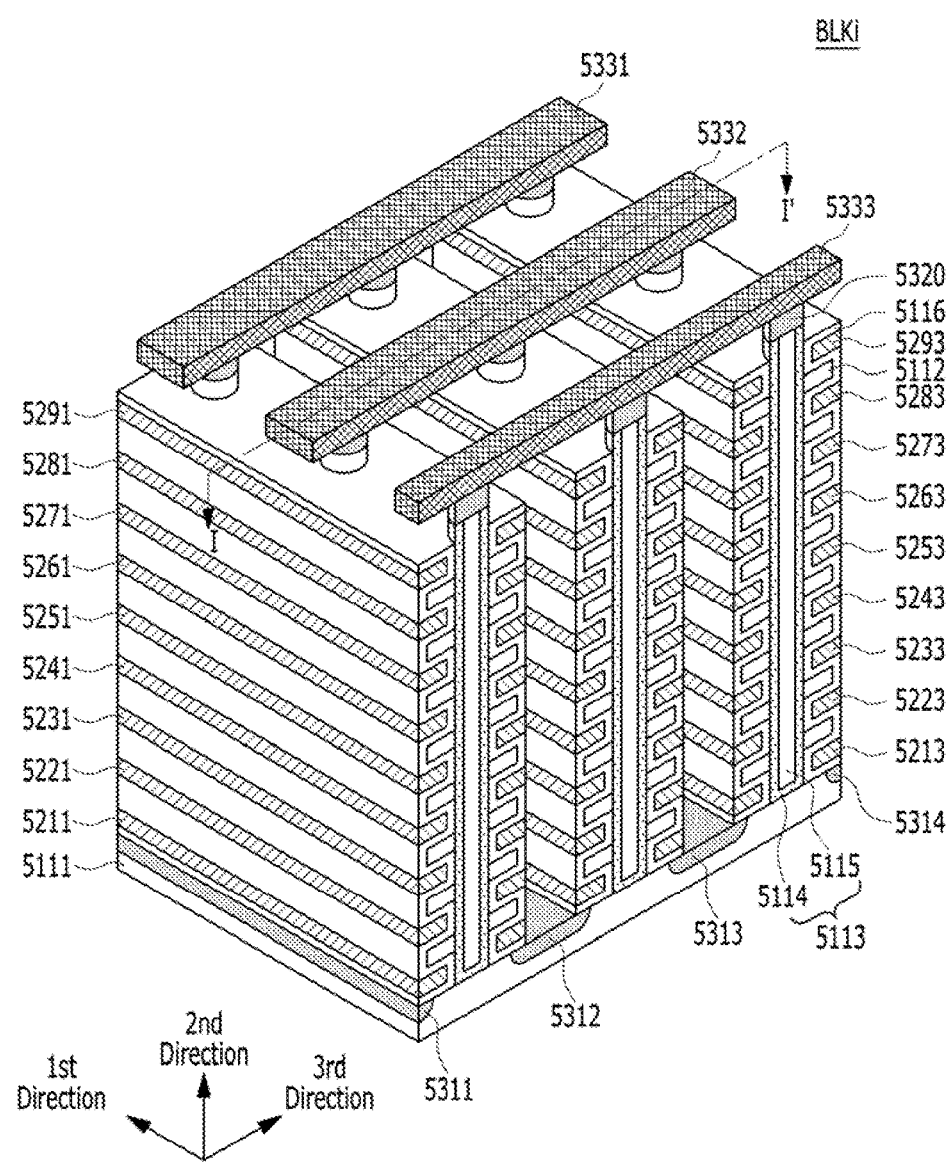
Figure 6:
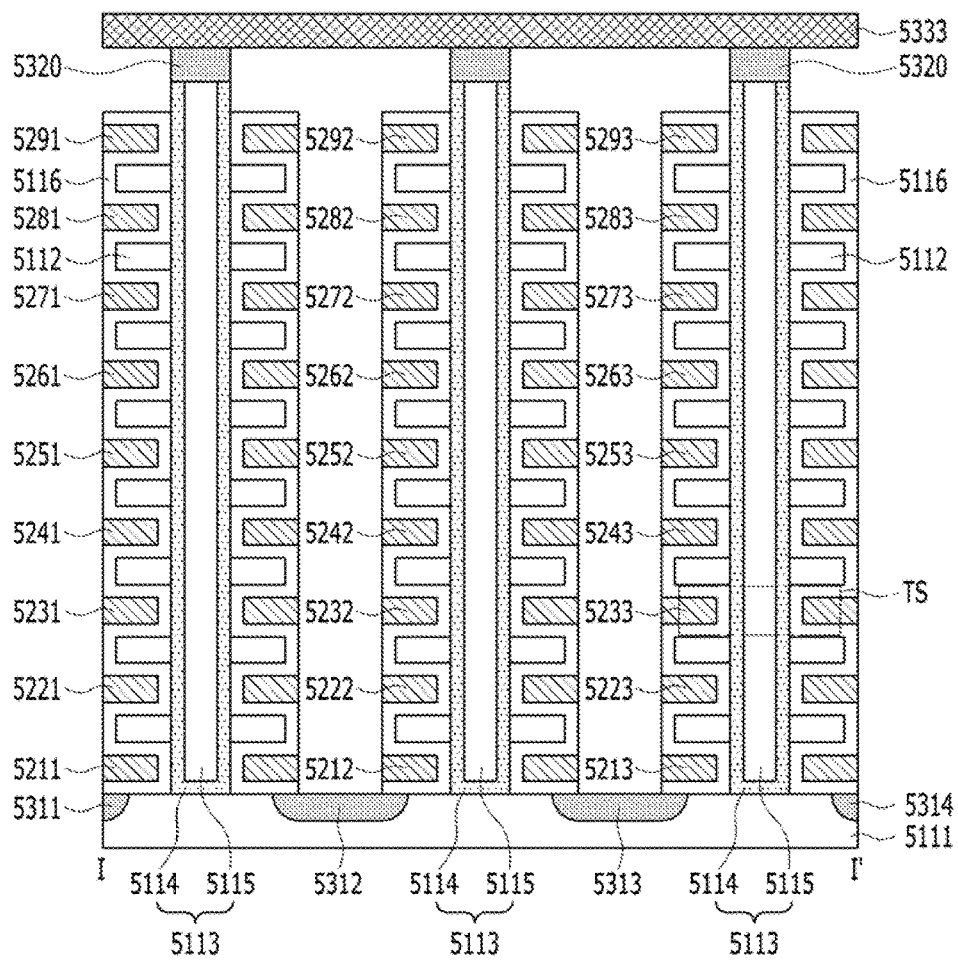

FIG. 5 is a perspective view of one memory block BLKi of the plurality of memory blocks BLK0 to BLKN−1 shown in FIG. 4. FIG. 6 is a cross-sectional view taken along a line I-I' of the memory block BLKi shown in FIG. 5.

Referring to FIGS. 5 and 6, a memory block BLKi may include a structure extending in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is p-type silicon, it is to be noted that the substrate 5111 is not limited to being p-type silicon.

A plurality of doping regions 5311 to 5314 extending in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 extending in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be coupled electrically with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (I) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 extending in the first direction may be provided between the dielectric material 5112 adjacent to the substrate 5111 and the substrate 5111. For example, the conductive material 5211 extending in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material extending in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 extending in the first direction may be provided between the dielectric materials 5112. The conductive material 5291 extending in the first direction may be provided over the uppermost dielectric material 5112. The conductive materials 5211 to 5291 extending in the first direction may be a metallic material. The conductive materials 5211 to 5291 extending in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 extending in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 extending in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 extending in the third direction may be provided over the drains 5320. The conductive materials 5331 to 5333 may be spaced along the first direction at a regular interval. Each conductive material 5331 to 5333 may be coupled electrically with the drains 5320 of corresponding pillar regions disposed along a same row in the third direction. Each conductive material 5331 to 5333 may be coupled electrically with the drains of corresponding pillar regions disposed along a same row in the third direction with contact plugs (not shown). Each conductive material 5331 to 5333 may be or comprise a metallic material. Each conductive material 5331 to 5333 may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 extending in the first direction. The respective pillars 5113 may form NAND strings NS together with the dielectric layer 5116 and the conductive materials 5211 to 5291, 5212 to 5292 and 5213 to 5293 extending in the first direction. Each NAND string NS may include a plurality of transistor structures TS.

Figure 7:
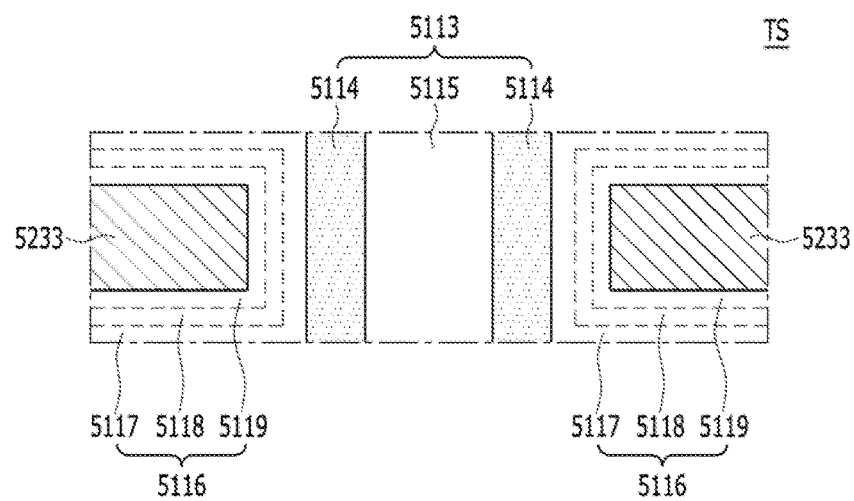

FIG. 7 is an enlarged cross-sectional view of a transistor structure TS shown in FIG. 6.

Referring to FIG. 7, in the transistor structure TS shown in FIG. 6, the dielectric layer 5116 may include first to third sub-dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer and may include a nitride layer or a metal oxide layer, such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer, such as an aluminum oxide layer, a hafnium oxide layer, or the like, having a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 extending in the first direction. In other words, the gates or the control gates may extend in the first direction and form word lines and at least two select lines, at least one source select line SSL and at least one ground select line GSL.

The conductive materials 5331 to 5333 extending in the third direction may be coupled electrically to one end of the NAND strings NS. The conductive materials 5331 to 5333 extending in the third direction may serve as bit lines BL. That is, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

Namely, the memory block BLKi may include a plurality of NAND strings NS extending in a direction perpendicular to the substrate 5111, and may serve as a NAND flash memory block, for example, of a charge capturing type memory, in which a plurality of NAND strings NS are coupled electrically to one-bit line BL.

While it is illustrated in FIGS. 5 to 7 that the conductive materials 5211 to 5291, 5212 to 5292 and 5213 to 5293 extending in the first direction are provided in 9 layers, it is to be noted that the conductive materials 5211 to 5291, 5212 to 5292 and 5213 to 5293 extending in the first direction are not limited to being provided in 9 layers. For example, conductive materials extending in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are coupled electrically to one-bit line BL, it is to be noted that the embodiment is not limited to having 3 NAND strings NS that are coupled electrically to one-bit line BL. In the memory block BLKi, m number of NAND strings NS may be coupled electrically to one-bit line BL, m being a positive integer. According to the number of NAND strings NS which are coupled electrically to one-bit line BL, the number of conductive materials 5211 to 5291, 5212 to 5292 and 5213 to 5293 extending in the first direction and the number of common source lines 5311 to 5314 may be controlled as well.

Further, while it is illustrated in FIGS. 5 to 7 that 3 NAND strings NS are coupled electrically to one conductive material extending in the first direction, it is to be noted that the embodiment is not limited to having 3 NAND strings NS coupled electrically to one conductive material extending in the first direction. For example, n number of NAND strings NS may be coupled electrically to one conductive material extending in the first direction, n being a positive integer. According to the number of NAND strings NS which are coupled electrically to one conductive material extending in the first direction, the number of bit lines 5331 to 5333 may be controlled as well.

Figure 8:
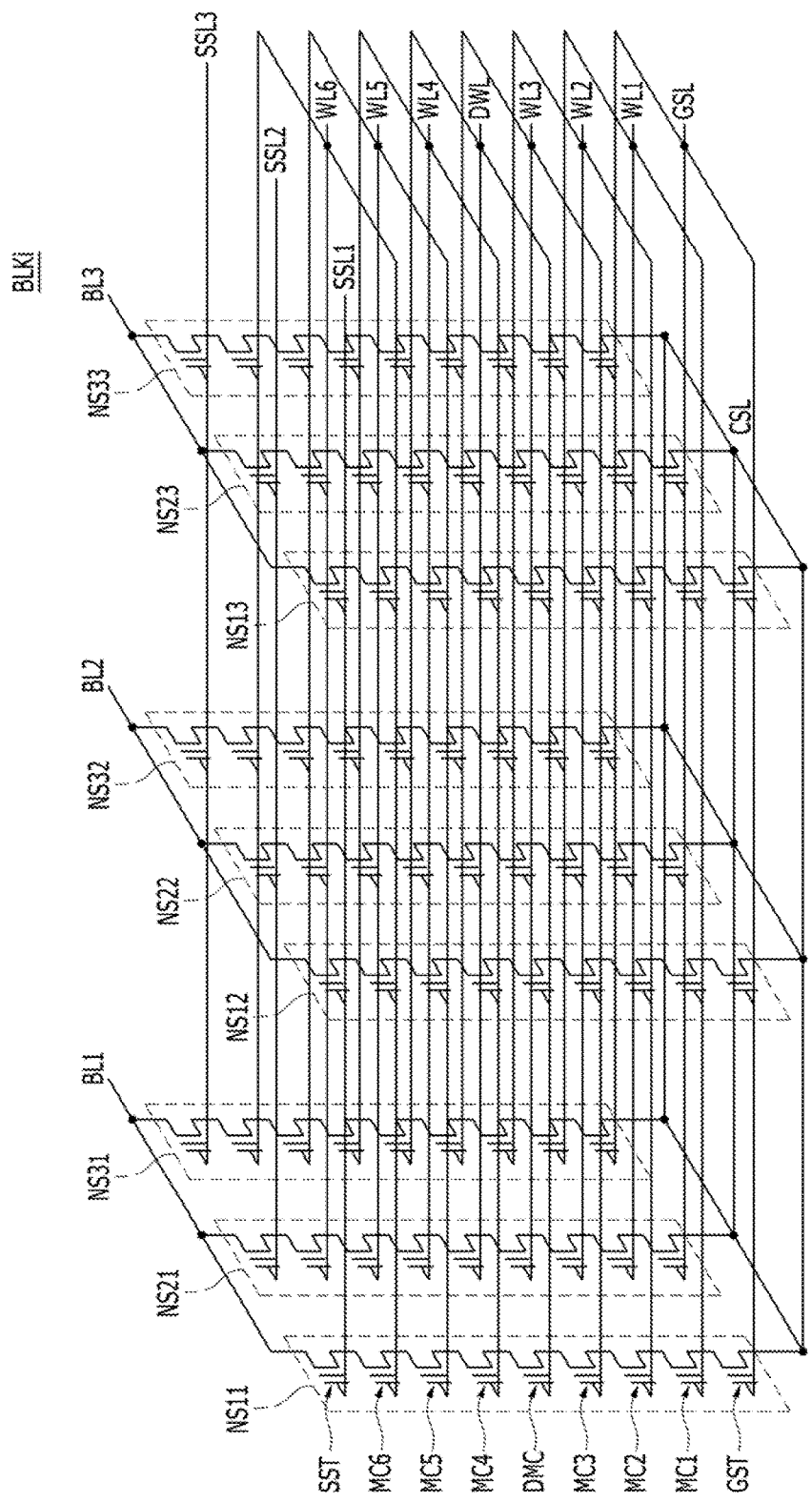

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, extending in the third direction. NAND strings NS12 to NS32 may be provided between a second bit line BL2 and the common source line CSL. The second bit line BL2 may correspond to the conductive material 5332 of FIGS. 5 and 6, extending in the third direction. NAND strings NS13 to NS33 may be provided between a third bit line BL3 and the common source line CSL. The third bit line BL3 may correspond to the conductive material 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC may be provided between the source select transistor SST and the ground select transistor GST of each NAND string NS.

In this example, NAND strings NS may be defined by units of rows and columns and NAND strings NS which are coupled electrically to one-bit line may form one column. The NAND strings NS11 to NS31 which are coupled electrically to the first bit line BL1 may correspond to a first column, the NAND strings NS12 to NS32 which are coupled electrically to the second bit line BL2 may correspond to a second column, and the NAND strings NS13 to NS33 which are coupled electrically to the third bit line BL3 may correspond to a third column. NAND strings NS which are coupled electrically to one source select line SSL may form one row. The NAND strings NS11 to NS13 which are coupled electrically to a first source select line SSL1 may form a first row, the NAND strings NS21 to NS23 which are coupled electrically to a second source select line SSL2 may form a second row, and the NAND strings NS31 to NS33 which are coupled electrically to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively coupled electrically to the different source select lines SSL1, SSL2 and SSL3.

The memory cells at the same height in the NAND strings NS in the same row may share a word line WL. That is, at the same height, the word lines WL coupled electrically to the memory cells MC of the NAND strings NS in different rows may be coupled electrically. Dummy memory cells DMC at the same height in the NAND strings NS of the same row may share a dummy word line DWL. Namely, at the same height or level, the dummy word lines DWL coupled electrically to the dummy memory cells DMC of the NAND strings NS in different rows may be coupled electrically.

The word lines WL or the dummy word lines DWL located at the same level or height or layer may be coupled electrically with one another at layers where the conductive materials 5211 to 5291, 5212 to 5292 and 5213 to 5293 extending in the first direction may be provided. The conductive materials 5211 to 5291, 5212 to 5292 and 5213 to 5293 extending in the first direction may be coupled electrically, in common, to upper layers through contacts. At the upper layers, the conductive materials 5211 to 5291, 5212 to 5292 and 5213 to 5293 extending in the first direction may be coupled electrically. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be coupled electrically to the ground select line GSL.

The common source line CSL may be coupled electrically to the NAND strings NS. Over the active regions and over the substrate 5111, the first to fourth doping regions 5311 to 5314 may be coupled electrically. The first to fourth doping regions 5311 to 5314 may be coupled electrically to an upper layer through contacts and, at the upper layer, the first to fourth doping regions 5311 to 5314 may be coupled electrically.

Namely, as shown in FIG. 8, the word lines WL of the same height or level may be coupled electrically. Accordingly, when a word line WL at a specific height is selected, all NAND strings NS which are coupled electrically to the word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system according to an embodiment implemented with a 3D nonvolatile memory device different from the first structure.

Figure 9:
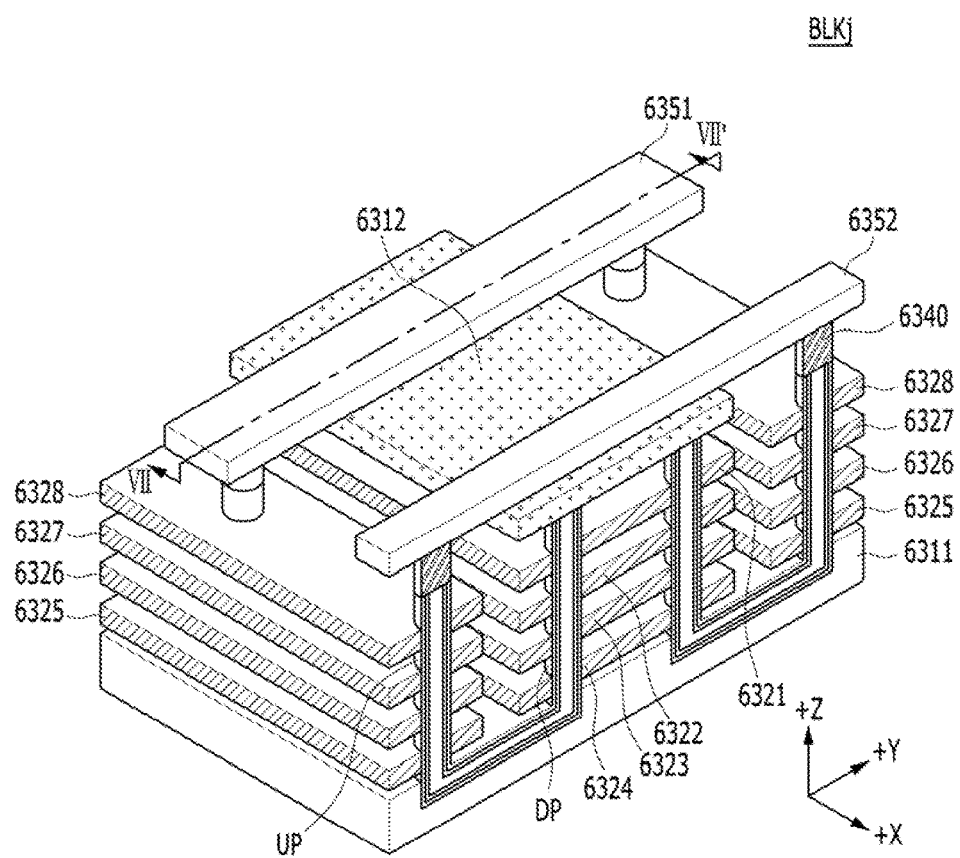

FIG. 9 is a perspective view schematically illustrating the memory device implemented with the 3D nonvolatile memory device, which is different from the first structure described above with reference to FIGS. 5 to 8, and showing a memory block BLKj of the plurality of memory blocks of FIG. 4. FIG. 10 is a cross-sectional view of the memory block BLKj taken along the line VII-VII' of FIG. 9.

Figure 10:
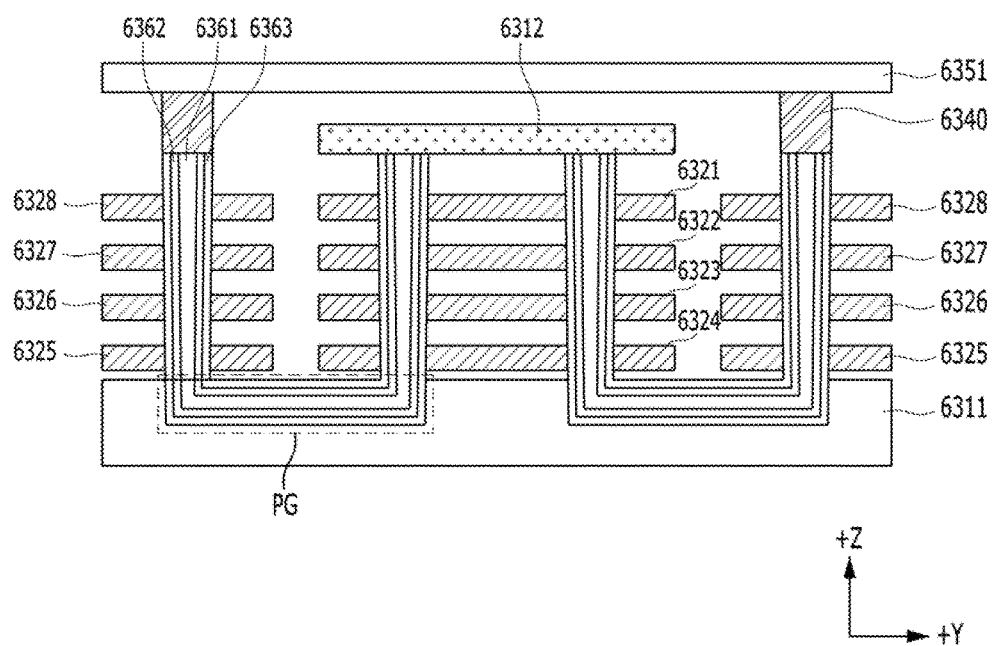

Referring to FIGS. 9 and 10, the memory block BLKj may include structures extending in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the described embodiment for the sake of convenience that the substrate 6311 is p-type silicon, it is to be noted that the substrate 6311 is not limited to being p-type silicon.

First to fourth conductive materials 6321 to 6324 extending in the x-axis direction and the y-axis direction may be provided over the substrate 6311. The first to fourth conductive materials 6321 to 6324 may be separated by a predetermined distance in the z-axis direction.

Fifth to eighth conductive materials 6325 to 6328 extending in the x-axis direction and the y-axis direction may be provided over the substrate 6311. The fifth to eighth conductive materials 6325 to 6328 may be separated by a predetermined distance in the z-axis direction. The fifth to eighth conductive materials 6325 to 6328 may be separated from the first to fourth conductive materials 6321 to 6324 in the y-axis direction.

A plurality of lower pillars DP may pass through the first to fourth conductive materials 6321 to 6324. Each lower pillar DP may extend in the z-axis direction. Also, a plurality of upper pillars UP may pass through the fifth to eighth conductive materials 6325 to 6328. Each upper pillar UP may extend in the z-axis direction.

Each of the lower and the upper pillars DP and UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically through a pipe gate PG. The pipe gate PG may be disposed in the substrate 6311. For instance, the pipe gate PG may include the same material as the material employed for the lower and upper pillars DP and UP.

A doping material 6312 of a second type extending in the x-axis and the y-axis directions may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 extending in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be coupled electrically through contact plugs. The first and second upper conductive materials 6351 and 6352 may serve as first and second bit lines BL1 and BL2, respectively.

The first conductive material 6321 may serve as a source select line SSL, the second conductive material 6322 may serve as a first dummy word line DWL1, and the third and fourth conductive materials 6323 and 6324 may serve as first and second main word lines MWL1 and MWL2, respectively. The fifth and sixth conductive materials 6325 and 6326 may serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP may form a lower string. The upper pillar UP and the fifth to eighth conductive materials 6325 to 6328 adjacent to the upper pillar UP may form an upper string. The lower string and the upper string may be coupled electrically through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string coupled electrically between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
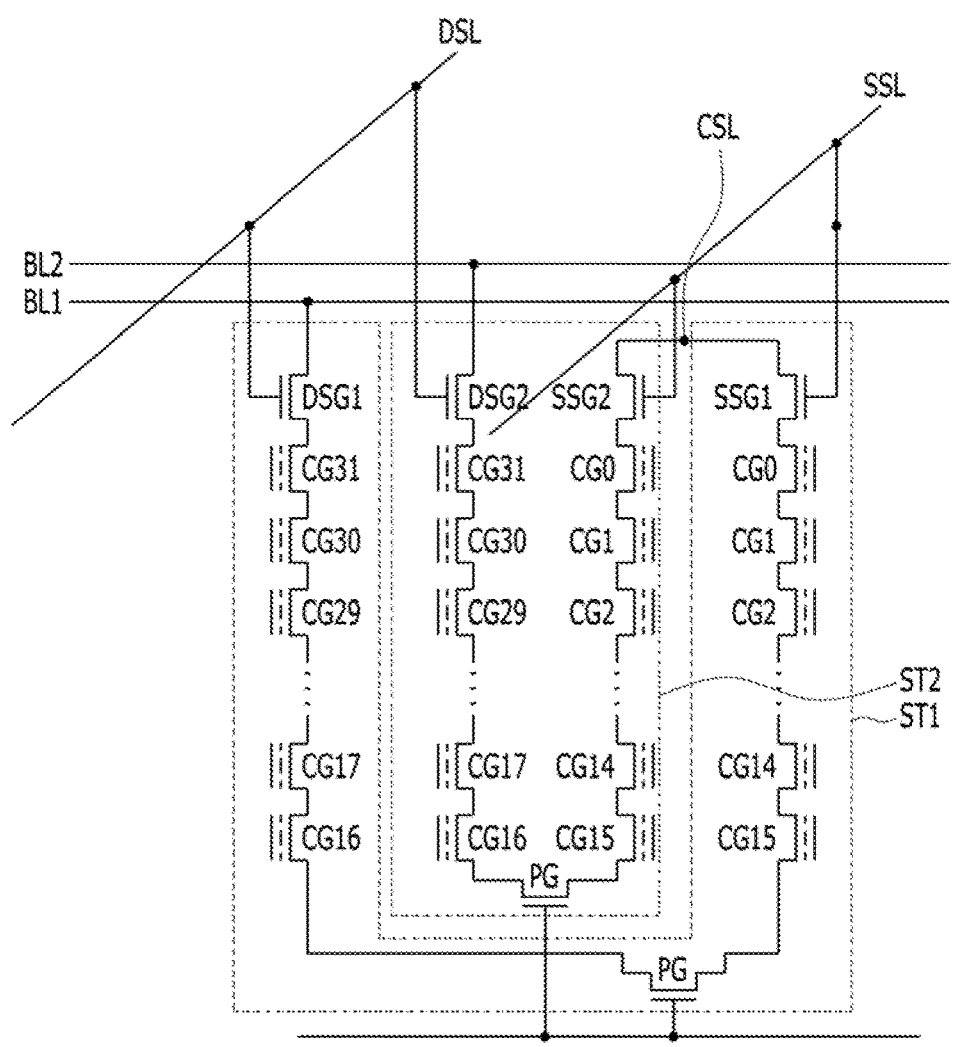

FIG. 11 is a circuit diagram illustrating the equivalent circuit of the memory block BLKj having the second structure as described above with reference to FIGS. 9 and 10. For the sake of convenience, only a first and a second string forming a pair in the memory block BLKj in the second structure are shown.

Referring to FIG. 11, in the memory block BLKj having the second structure among the plurality of blocks of the memory device 150, cell strings, each of which is implemented with one upper string and one lower string coupled electrically through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1, and the second string ST2 may be coupled electrically to a second bit line BL2.

While it is described in FIG. 11 that the first and second strings ST1 and ST2 may be coupled electrically to the same drain select line DSL and the same source select line SSL different layouts may be envisaged. For example, in an embodiment, the first and second strings ST1 and ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first and second strings ST1 and ST2 may be coupled electrically to the same drain select line DSL and the same bit line BL, the first string ST1 may be coupled electrically to a first source select line SSL1 and the second string ST2 may be coupled electrically to a second source select line.

Hereafter, an operation of processing data to a memory device in a memory system according to an embodiment of the present invention, for example, an operation of processing command data to the memory device 150 in response to a command received from the host 102, will be described in more detail with reference to FIGS. 12 and 14.

Figure 12:
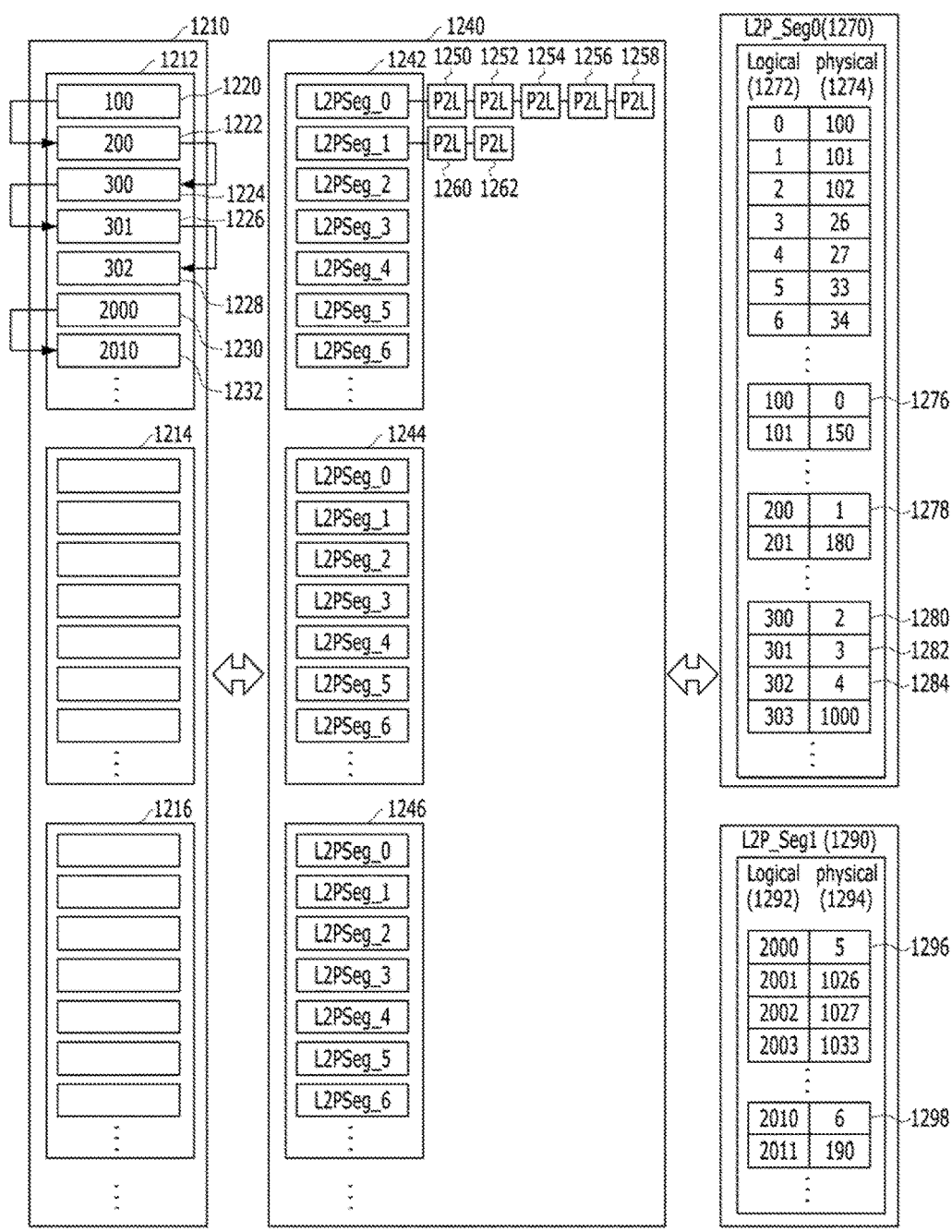
FIGS. 12 and 13 are diagrams of a data processing operation of a memory system, according to an embodiment of the present invention.
Figure 13:
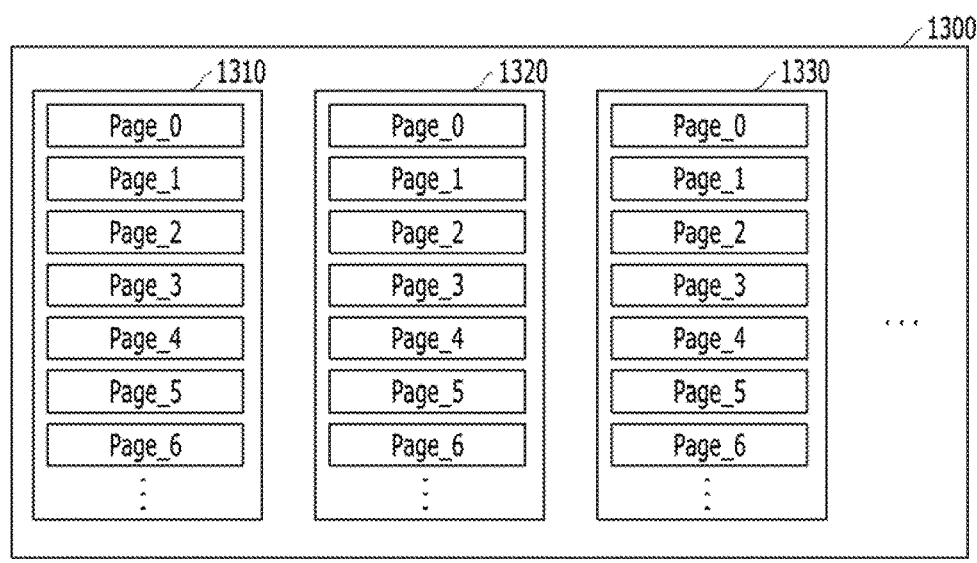
Figure 13:
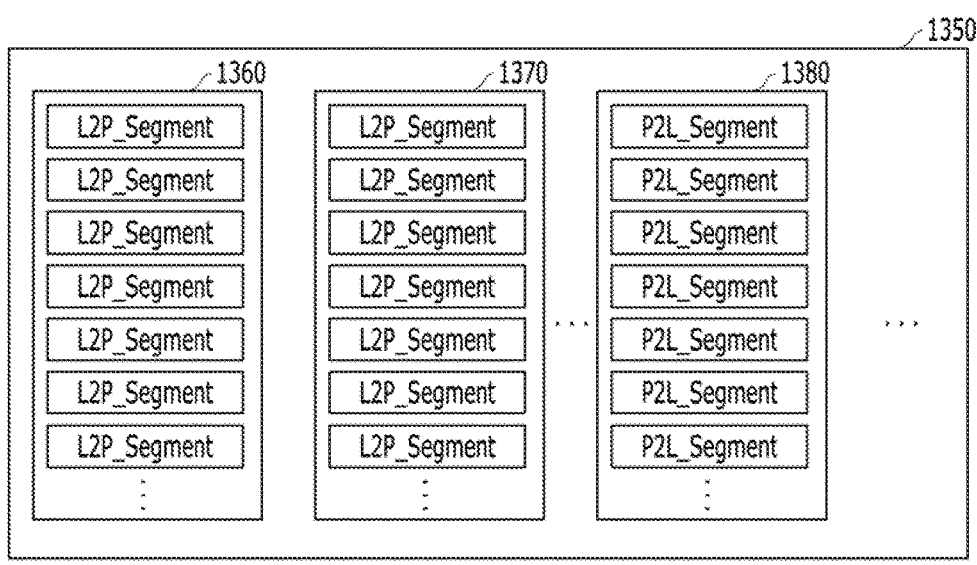

FIGS. 12 and 13 are diagrams illustrating a data processing operation of a memory system, according to an embodiment of the present invention. Hereafter, for simplicity, as an example, it is assumed that the memory system 110 illustrated in FIG. 1 processes command data corresponding to a command received from the host 102, and performs a command operation on the memory device 150. That is, the memory system 110 may write and store write data corresponding to a write command into a plurality of memory blocks included in the memory device 150. The memory system 110 may also update map data corresponding to the write data stored into the plurality of memory blocks, and store the updated map data into the plurality of memory blocks. For example, the memory system 110 may store the write data corresponding to the write command received by the host 102 in a first memory block selected from the plurality of the memory blocks of the memory device, and may store the updated map data into a second memory block selected from the plurality of memory blocks of the memory device. The first and second memory blocks may be the same or different memory blocks. In an embodiment, the first and second memory blocks are different memory blocks.

Furthermore, it will be described as an example that the data processing operation of the memory system 110 is performed by the controller 130. As described above, the processor 134 included in the controller 130 may perform the data processing operation through FTL, for example. The controller 130 may be an integral part of the memory system 110.

When the controller 130 performs a write operation corresponding to a command received from the host 102, the controller 130 may check map data corresponding to the write operation. For example, the map data may include first map data containing L2P (Logical to Physical) information (hereafter, referred to as 'logical information') and second map data containing P2L (Physical to Logical) information (hereafter, referred to as 'physical information'). The controller 130 may update the map data, and store the updated map data in one or more memory blocks of the memory device 150. Then, when the controller 130 performs a write or read operation corresponding to the command received from the host 102, the controller 130 may check and update the map data stored in the memory blocks of the memory device 150, and perform the write or read operation or process the command data corresponding to the command received from the host 102.

In an embodiment of the present invention, when the controller 130 receives a write command from the host 102, the controller 130 may write and store user data corresponding to the write command into an open block or a free block among memory blocks, for example, user data blocks, of the memory device 150, and update and store the first map data and the second map data corresponding to the user data in an open block or a free block among memory blocks, for example, map blocks, of the memory device 150. The first map data may include an L2P map table containing mapping information between logical addresses and physical addresses on the user data stored in the memory blocks, that is, logical information, and the second map data may include a P2L map table containing mapping information between physical addresses and logical addresses on the memory blocks having the user data stored therein, that is, physical information.

In particular, when a write command is received from the host 102, the controller 130 may write and store user data corresponding to the write command into user memory blocks, and store the first and second map data on the user data into map memory blocks. At this time, the controller 130 may also sort physical segments (for example, P2L segments) containing physical information of the second map data for each of the logical segments (the L2P segments) of the first map data. Then, the controller 130 may form an entry, tree, link, or hash table for the sorted physical segments for each of the logical segments. Furthermore, as the user data corresponding to the write command are stored in the memory blocks, the controller 130 may form the entry, tree, link, or hash table of the sorted physical segments for each of the logical segments of the user data, and generate a logical segment list, for example, an L2P write segment list. Then, the controller 130 may store the generated logical segment list in the memory 144 included in the controller 130 (also referred to hereinafter as the controller memory), for example, in a map buffer or a map cache of the memory 144.

In the logical segment list, the physical segments (for example, P2L segments) containing the physical information of the memory blocks for the written user data may be sorted for each of the logical segments (for example, L2P segments) containing the logical information of the written user data, according to the write operation of the user data. The entry, tree, link, or hash table of the sorted physical segments corresponding to each of the logical segments may be included. That is, the logical segment list may include list information on the logical segments in which the entries of the physical segments are formed. The physical segments corresponding to each of the logical segments may be sorted for the logical segment in the logical address sequence of the physical segments, and the entry, tree, link, or hash table may be formed between the sorted physical segments in the logical segment.

In an embodiment of the present invention, when the controller 130 receives a command from the host 102 and performs a command operation corresponding to the received command, the controller 130 may check the first map data and the second map data through the logical segment list for the logical segments of the first map data stored in the memory 144 of the controller 130. In particular, when the first and second map data stored in the map blocks among the memory blocks of the memory device 150 are loaded to the memory 144 of the controller 130 in order to check the map data of the command data corresponding to the command, the controller 130 may check the second map data corresponding to the first map data through the logical segment list. Thus, a scanning operation for the physical information corresponding to the first map data of the command data in the second map data loaded to the memory 144 of the controller 130 is not required.

That is, after the logical segments of the first map data stored in the memory blocks of the memory device 150 are loaded to the memory 144 of the controller 130, through the logical segment list stored in the memory 144 of the controller 130, the controller 130 may check the entries of the physical segments for the logical segments of the first map data loaded to the memory 144 of the controller 130. The entries of the physical segments may be formed in the respective logical segments in the logical segment list. Thus, the controller 130 may rapidly and accurately check the physical segments for the logical segments of the first map data corresponding to the command data, or rapidly and accurately check the second map data of the first map data corresponding to the command data. Therefore, the command operation corresponding to the command received from the host 102 may be performed more rapidly than with existing memory systems. Hence, the memory system 110, according to an embodiment of the invention may perform an operation of processing data to the memory device 150 more rapidly than existing memory systems.

For example, when the controller 130 receives a write command from the host 102 and performs a write operation corresponding to the write command, the controller 130 may write and store write data corresponding to the write command into an open block of the user data blocks of the plurality memory blocks of the memory device 150. When the controller 130 updates map data corresponding to the write operation, the controller 130 may check the logical segment list, and check logical segments to be updated, among the logical segments of the first map data stored in the map blocks of the memory blocks of the memory device 150. Then, the controller 130 may load the logical segments to be updated, to the memory 144 of the controller 130, check the entries of the physical segments in the logical segment list with regard to the loaded logical segments of the first map data, and update the first map data corresponding to the write operation. Furthermore, the controller 130 may update the second map data stored in the map blocks among the memory blocks of the memory device 150 through the logical segment list configured through the write operation. As described above, in the logical segment list, the physical segments (for example, P2L segments) containing the physical information of the memory blocks for the written user data may be sorted for each of the logical segments (for example, L2P segments) containing the logical information of the written user data, according to the write operation, and the entry, tree, link, or hash table of the sorted physical segments corresponding to each of the logical segments may be included.

Thus, the controller 130 may not require a scanning operation for the physical segments of the second map data corresponding to the logical segments of the first map data, in order to check the physical segments corresponding to the logical segments of the first map data, which need to be updated. After checking the logical segments of the first map data through the logical segment list, the controller 130 may check the entry, tree, link, or hash table of the physical segments formed in the logical segments of the first map data, which need to be updated, in the logical segment list, so as to rapidly and accurately check the physical segments corresponding to the logical segments of the first map data, which need to be updated. In particular, when the controller 130 updates the map data corresponding to the write operation, the controller 130 does not require an operation of scanning the segments of the second map data corresponding to the respective segments of the first map data loaded from the map blocks among the memory blocks of the memory device 150 to the memory 144 of the controller 130. Thus, the update of the map data corresponding to the write operation may be rapidly performed.

Furthermore, when the controller 130 receives a read command from the host 102 and performs a read operation corresponding to the read command, the controller 130 may check logical segments of the first map data on read data corresponding to the read command through the logical segment list, check the entries of the physical segments, which are formed in the checked logical segments, and check the physical segments of the second map data on the read data, that is, the physical information of the read data. Thus, the controller 130 may read the data stored in the user data block among the memory blocks of the memory device 150, and provide the read data corresponding to the read command to the host 102. In the embodiment of the present invention, the controller 130 may check the latest write update information on the read data corresponding to the read command through the logical segment list. That is, the controller 130 may check the logical segments of the first map data on the read data and the corresponding physical segments of the second map data, that is, the physical information of the read data.

Therefore, the controller 130 may rapidly and accurately check the physical segments corresponding to the logical segments of the read data as the latest write update information on the read data through the logical segment list. In particular, even while minimizing the number of scanning operations for scanning the physical segments of the second map data stored in the map blocks among the memory blocks of the memory device 150, the controller 130 may check the physical segments corresponding to the logical segments of the read data, that is, the physical information, thereby rapidly checking the map data on the read data corresponding to the read operation. Hereafter, the memory system according to the embodiment of the present invention will be described in more detail with reference to FIGS. 12 and 13.

Referring to FIGS. 12 and 13, the controller 130 may write and store write data corresponding to a command received from the host 102, for example, a write command, into open blocks 1310 to 1330 of a user data block 1300 among the memory blocks of the memory device 150, and update and store map data of the write data into open blocks 1360 to 1380 of a map block 1350 among the memory blocks of the memory device, according to the write operation to the user data block 1300.

More specifically, the controller 130 may write the write data corresponding to the write command received from the host 102, for example, data with logical addresses 100, 200, 300, 301, 302, 2000 and 2010 (hereafter, referred to as data 100, data 200, data 300, data 301, data 302, data 2000 and data 2010, respectively) to the user data block 1300 of the memory device 150, for example, the first open block 1310 among the open blocks 1310 to 1330 included in the user data block 1300.

For example, it is described that the data 100 to data 2010 are written and stored in respective pages Page_0 to Page_6 of the first open block 1310 among the open blocks 1310 to 1330 included in the user data block 1300 of the memory device 150.

That is, the controller 130 may write the write data corresponding to the write command received from the host 102, that is, the data 100, the data 200, the data 300, the data 301, the data 302, the data 2000, and the data 2010 to the first to seventh pages Page_0 to Page_6, respectively, which are included in the first open block 1310 of the user data block 1300 among the memory blocks of the memory device 150. Furthermore, the controller 130 may update and store map data corresponding to the write operation into the open blocks 1360 to 1380 of the map block 1350 among the memory blocks of the memory device 150. In other words, the controller 130 may store the logical segments L2P_Segment of the first map data corresponding to the write operation in the first and second open blocks 1360 and 1370, and store the physical segments P2L_Segment of the second map data corresponding to the write operation in the third open block 1380.

Furthermore, as the controller 130 performs the write operation corresponding to the write command received from the host 102 such that the data 100, the data 200, the data 300, the data 301, the data 302, the data 2000, and the data 2010 are written to the first to seventh pages Page_0 to Page_6 of the first open block 1310 of the user data block 1300, the physical segments of the second map data containing the physical information on the first open block 1310 of the user data block 1300 may be stored in the open blocks 1212, 1214, and 1216 of the map block 1210 included in the memory 144 of the controller 130.

More specifically, as the data 100, the data 200, the data 300, the data 301, the data 302, the data 2000, and the data 2010 are written to the first to seventh pages Page_0 to Page_6 in the first open block 1310 of the user data block 1300, the physical segments of the second map data containing the physical information corresponding to the write operation may be stored in the first open block 1212 of the map block 1210 included in the memory 144 of the controller 130. At this time, a physical segment 100(1220) indicating that the data 100 is written to the first page Page_0 of the first open block 1310 in the user data block 1300 of the memory device 150 may be stored in the first open block 1212 of the map block 1210 included in the memory 144 of the controller 130. Similarly, physical segments 200(1222), 300(1224), 301(1226), 302(1228), 2000(1230), and 2010 (1232) may be stored in the first open block 1212 of the map block 1210 included in the memory 144 of the controller 130.

Furthermore, when a predetermined logical address offset is set between the logical segments included in the first map data or the logical segments included in the first map data have a predetermined logical address offset therebetween, the logical information on the data 100, the data 200, the data 300, the data 301, the data 302, the data 2000, and the data 2010 written to the first to seventh pages Page_0 to Page_6 in the first open block 1310 of the user data block 1300 may be contained in the corresponding logical segments of the first map data, based on the logical address offset. Hereafter, it will be described as an example that the logical address offset between the logical segments included in the first map data is 2000, for a simple description.

That is, when the logical address offset between the logical segments included in the first map data is 2000, the logical information on the data 100, the data 200, the data 300, the data 301, and the data 302 written to the first to fifth pages Page_0 to Page_4 in the first open block 1310 of the user data block 1300 may be contained in a first logical segment 0 of the first map data, for example, a logical segment L2PSeg_0, and the logical information on the data 2000 and the data 2010 written to the sixth and seventh pages Page_5 and Page_6 in the first open block 1310 of the user data block 1300 may be contained in a second logical segment of the first map data, for example, a logical segment L2PSeg_1.

Furthermore, as the data 100, the data 200, the data 300, the data 301, the data 302, the data 2000, and the data 2010 are written to the first to seventh pages Page_0 to Page_6 in the first open block 1310 of the user data block 1300, the controller 130 may sort the physical segments corresponding to the write operation for each of the logical segments of the first map data, build a logical segment list 1240 by forming an entry, tree, link, or hash table between the physical segments sorted for each of the logical segments, and store the logical segment list 1240 in the memory 144 included in the controller 130, for example, in a map buffer or a map cache of the memory 144.

For example, the controller 130 may sort physical segments for the first logical segment of the first map data among the physical segments stored in the first open block 1212 of the map block 1210 included in the memory 144, that is, the physical segment 100(1220), the physical segment 200(1222), the physical segment 300(1224), the physical segment 301(1226), and the physical segment 302(1228) for the logical segment L2PSeg 0 in the logical address sequence, and then configure a first logical segment list 1242 of the logical segment list 1240 by forming an entry, tree, link, or hash table between the sorted physical segments, that is, P2L segments 1250, 1252, 1254, 1256, and 1258 sorted for the logical segment L2PSeg 0. At this time, the controller 130 may build the logical segment list 1240 such that the first to firth P2L segments 1250, 1252, 1254, 1256, and 1258 correspond to the physical segments 100(1220), 200(1222), 300(1224), 301(1226), and 302(1228), for the logical segment L2PSeg 0 of the first logical segment list 1242.

Furthermore, the controller 130 may sort physical segments for the second logical segment of the first map data among the physical segments stored in the first open block 1212 of the map block 1210 included in the memory 144, that is, the physical segment 2000(1230) and the physical segment 2010(1232) for the logical segment L2PSeg 1, in the logical address sequence. Then, the controller 130 may configure the first logical segment list 1242 of the logical segment list 1240 by forming an entry, tree, link, or hash table between the sorted physical segments, that is, P2L segments 1260 and 1262 sorted for the logical segment L2PSeg 1. At this time, the controller 130 may configure the logical segment list 1240 such that the first P2L segment 1260 corresponds to the physical segment 2000(1230) and the second P2L segment 1262 corresponds to the physical segment 2010(1232), for the logical segment L2PSeg 1 in the first logical segment list 1242.

Furthermore, the logical segment list 1240 may have a header region which includes information indicating logical segments corresponding to the write operation to the user data block 1300 of the memory device 150. The physical segments may be sorted for each of the logical segments corresponding to the indication information included in the header region, and P2L entries may be formed in nodes set to the sorted physical segments. At this time, the nodes in which the P2L entries are formed may include a physical offset between the sorted physical segments.

Furthermore, as the data 100, the data 200, the data 300, the data 301, the data 302, the data 2000, and the data 2010 are written to the first to seventh pages Page_0 to Page_6 in the first open block 1310 of the user data block 1300, the controller 130 may update the first map data stored in the first and second open blocks 1360 and 1370 of the map block 1350 of the memory device 150, according to the write operation. In order to update the first map data, the controller 130 may check the logical segments of the first map data, which need to be updated according to the write operation, and load the logical segments of the first map data stored in the first and second open blocks 1360 and 1370 to the memory 144 of the controller 130, for example, the map buffer or the map cache included in the memory 144 of the controller 130.

At this time, the controller 130 may check the logical segments of the first map data, which need to be updated, through the logical segment list 1240. For example, the controller 130 may check the logical segments L2PSeg 0 and L2PSeg 1 as the logical segments which need to be updated, through the first logical segment list 1242, and load the logical segments to the memory 144 of the controller 130 from the map block 1350 of the memory device 150.

More specifically, as the data 100, the data 200, the data 300, the data 301, the data 302, the data 2000, and the data 2010 are written to the first to seventh pages Page_0 to Page_6 in the first open block 1310 of the user data block 1300, the controller 130 may check the logical segments corresponding to the data 100, the data 200, the data 300, the data 301, the data 302, the data 2000, and the data 2010 among the logical segments of the first map data stored in the first and second open blocks 1360 and 1370, in order to update the first map data corresponding to the data 100, the data 200, the data 300, the data 301, the data 302, the data 2000, and the data 2010.

That is, the controller 130 may check that the logical information on the data 100, the data 200, the data 300, the data 301, and the data 302 is contained in the first logical segment of the first map data, for example, the logical segment L2PSeg 0, and the logical information on the data 2000 and the data 2010 is contained in the second logical segment of the first map data, for example, the logical segment L2PSeg 1. Thus, the controller 130 may load the logical segment L2P-Seg0(1270) to the memory 144, in order to update the first map data on the data 100, the data 200, the data 300, the data 301, and the data 302, and load the logical segment L2P_Seg1(1290) to the memory 144, in order to update the first map data on the data 2000 and the data 2010.

At this time, since the logical address offset between the logical segments is 2000 as described above, the logical segment L2P_Seg0(1270) loaded to the memory 144 of the controller 130 from the map block 1350 of the memory device 150 may include a logical/physical address table (1272/1274) indicating physical addresses corresponding to the logical addresses 0 to 1999, and the logical segment L2P_Seg1(1290) loaded to the memory 144 of the controller 130 from the map block 1350 of the memory device 150 may include a logical/physical address table (1292/1294) indicating physical addresses corresponding to the logical addresses 2000 to 3999.

At this time, in order to update the logical segment L2P_Seg0(1270) loaded to the memory 144, the controller 130 may not scan the physical segments stored in the map block 1210 of the memory 144, corresponding to the logical segment L2P_Seg0(1270), but check the P2L segments 1250, 1252, 1254, 1256, and 1258 having the entry, tree, link, or hash table formed therein for the logical segment L2PSeg_0 in the logical segment list 1240. That is, the controller 130 may check the P2L segments 1250, 1252, 1254, 1256, and 1258 of the logical segment L2PSeg_0 in the logical segment list 1240, without scanning the physical segments stored in the map block 1210 of the memory 144 for the logical segment L2P_Seg0(1270) loaded to the memory 144, thereby checking the physical segments for the logical segment L2P_Seg0(1270).

The controller 130 may update the P2L segments 1250, 1252, 1254, 1256, and 1258 in the logical segment L2P_Seg0(1270) loaded to the memory 144 of the controller 130. That is, the controller 130 may update the logical/physical address 100/0(1276), the logical/physical address 200/1(1278), the logical/physical address 300/2(1280), the logical/physical address 301/3(1282), and the logical/physical address 302/4(1284) in the logical segment L2P_Seg0(1270) loaded to the memory 144 of the controller 130.

Furthermore, in order to update the logical segment L2P_Seg1(1290) loaded to the memory 144, the controller 130 may not scan the physical segments stored in the map block 1210 of the memory 144, corresponding to the logical segment L2P_Seg1(1290), but check the P2L segments 1260 and 1262 having an entry, tree, link, or hash table formed therein for the logical segment L2PSeg_1 in the logical segment list 1240. That is, the controller 130 may check the P2L segments 1260 and 1262 of the logical segment L2PSeg_1 in the logical segment list 1240, without scanning the physical segments stored in the map block 1210 of the memory 144 for the logical segment L2P_Seg1(1290) loaded to the memory 144, thereby checking the physical segments for the logical segment L2P_Seg1(1290).

The controller 130 may update the P2L segments 1260 and 1262 in the logical segment L2P_Seg1(1290) loaded to the memory 144 of the controller 130, or update the logical/physical address 2000/5(1296) and the logical/physical address 2010/6(1298) in the L2P_Seg1(1290) loaded to the memory 144 of the controller 130.

Furthermore, as the data 100, the data 200, the data 300, the data 301, the data 302, the data 2000, and the data 2010 are written to the first to seventh pages Page_0 to Page_6 in the first open block 1310 of the user data block 1300, the controller 130 may update the first map data corresponding to the data 100, the data 200, the data 300, the data 301, the data 302, the data 2000, and the data 2010, and then store the updated first map data in the map block 1350 of the memory device 150. Furthermore, as the physical segments of the second map data stored in the memory 144 of the controller 130, the controller 130 may store the second map data in the map block 1350 of the memory device 150.

According to the embodiment of the present invention, when the memory system writes and stores data corresponding to a write command received from the host 102 into the memory blocks of the memory device 150, the memory system may sort the physical segments for each of the logical segments with regard to the written data, and build a logical segment list by forming the entry, tree, link, or hash table between the physical segments sorted for each of the logical segments. When updating the map data on the written data, for example, the first map data, the memory system may rapidly check the logical segments of the first map data, which need to be updated, and the physical segments for the logical segments through the logical segment list. In particular, the memory system may rapidly check the physical segments for the logical segments through the logical segment list, without scanning the physical segments. Furthermore, even during a read operation for a read command received from the host 102, the memory system may rapidly the physical segments for the logical segments of read data through the logical segment list. Now, referring to FIG. 14, the data processing operation of the memory system according to the embodiment of the present invention will be described in more detail.

Figure 14:
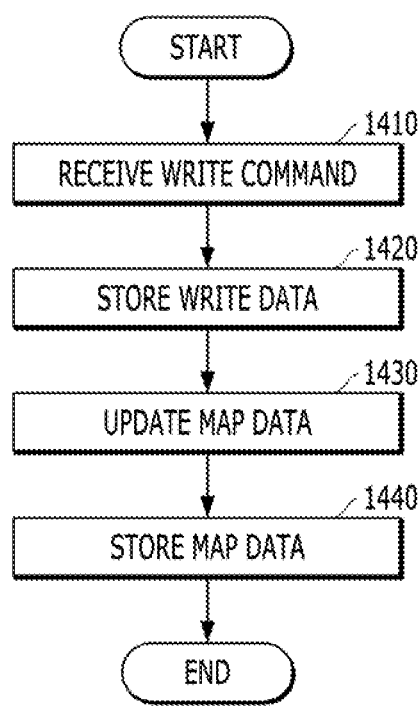
FIG. 14 is a flowchart illustrating a data processing operation of the memory system, according to an embodiment of the present invention.

FIG. 14 is a flowchart illustrating a data processing operation of the memory system, according to an embodiment of the present invention.

Referring to FIG. 14, the memory system may receive a command, for example, a write command from the host at step 1410. The memory system may store write data corresponding to the write command in memory blocks included in the memory device, for example, in open blocks of a user data block, at step 1420.

At this time, the memory system may sort physical segments for each logical segment of the write data, according to the write operation to the user data block of the memory device. Then, the memory system may build a logical segment list having an entry, tree, link, or hash table formed between the sorted physical segments, and store the logical segment list in the memory of the controller.

At step 1430, the memory system may check the logical segments of the first map data, which need to be updated, according to the write operation to the user data block of the memory device, and update the logical segments of the first map data.

Then, at step 1440, the memory system may store the updated map data in the memory blocks included in the memory device, for example, in open blocks of the map block.

Since the operation of storing the write data corresponding to the write command received from the host, the operation of building the logical segment list corresponding to the storage of the write data, the operation of updating and storing the map data using the logical segment list, and the read operation using the logical segment list have been described in detail with reference to FIGS. 12 and 13, the detailed descriptions thereof are omitted herein.

According to the embodiments of the present invention, the memory system and the operating method thereof may more rapidly and stably process data to the memory device.

Although various embodiments have been described for illustrative purposes, it will be apparent to those skilled in the art that various changes and modifications may be made without departing from the spirit and or scope of the invention as defined in the following claims.

What is claimed is:

1. A memory system comprising:
a memory device comprising a plurality of memory blocks including at least one first memory block for storing a data and at least one second memory block for storing a map data including a first map data and a second map data, wherein the first map data and the second map data have an inverse relation to each other; and
a controller comprising at least one controller memory, the controller for storing plural write data corresponding to a write command received from the host into the first memory block and updating the second map data corresponding to each of the plural write data,
wherein the controller is configured to:
generate a segment list by grouping second segments of the plural write data based on first segments of the plural write data;
store the segment list in the controller memory; and
update the first map data by checking the segment list.

2. The memory system of claim 1, wherein the controller loads second segments of the second map data from the second memory block into the controller memory, and sorts the second segments stored in the controller memory into each group of the first segments.

3. The memory system of claim 2, wherein the controller builds the segment list by forming one or more of an entry, a tree, a link, and a hash table between the sorted second segments for each group of the first segments.

4. The memory system of claim 3, wherein when updating the first map data stored in the second memory block, the controller checks a third segment which needs to be updated among the first segments of the first map data, through the segment list.

5. The memory system of claim 4, wherein the controller loads the third segment to the memory, and then checks the third segment and a corresponding one of the sorted second segments for the third segment in the segment list.

6. The memory system of claim 5, wherein the controller updates the corresponding one of the sorted second segments in the third segment loaded to the memory, and then stores the third segment in the second memory block.

7. The memory system of claim 3, wherein:
the first segments in the segment list have a logical address offset therebetween; and
the controller sorts the second segments for each group of the first segments, based on the logical address offset.

8. The memory system of claim 2, wherein the controller sorts the second segments for each of the first segments, in a logical address sequence.

9. The memory system of claim 1, wherein:
the first map data comprise logical to physical information corresponding to a data storage to the first memory block; and
the second map data comprise physical to logical information corresponding to the data storage to the first memory block.

10. The memory system of claim 1, wherein the controller checks logical information and physical information on read data corresponding to a read command received from the host, through the segment list.

11. An operating method of a memory system, comprising:
storing a data in at least one first memory block of a memory device;
storing a map data including a first map data and a second map data in at least one second memory block of the memory device, wherein the first map data and the second map data have an inverse relation to each other;
receiving a write command with plural write data from a host;
storing the plural write data corresponding to the write command in the first memory block and updating the second map data corresponding to each of the plural write data;

generating a segment list by grouping second segments of the plural write data based on first segments of the plural write data;

storing the segment list in a controller memory; and updating the first map data by checking the segment list.

12. The operating method of claim 11, further comprising:

loading second segments of the second map data from the second memory block into the controller memory, and sorting the second segments stored in the controller memory into each group of the first segments.

13. The operating method of claim 12, wherein the storing of the segment list further comprises:

building the segment list by forming one or more of an entry, a tree, a link, and a hash table between the sorted second segments for each group of the first segments.

14. The operating method of claim 13, further comprising:

updating the first map data stored in the second memory block by checking a third segment which needs to be updated among the first segments of the first map data, through the segment list.

15. The operating method of claim 14, wherein the updating of the first map data comprises:

loading the third segment to the memory, and checking the third segment and a corresponding one of the sorted second segments for the third segment in the segment list.

16. The operating method of claim 15, wherein the updating of the first map data further comprises:

updating the corresponding one of the sorted second segments in the third segment loaded to the memory, and then storing the third segment into the second memory block.

17. The operating method of claim 13, wherein:

the first segments in the segment list have a logical address offset therebetween; and the second segments are sorted for each group of the first segments, based on the logical address offset.

18. The operating method of claim 12, wherein the second segments are sorted for each of the first segments, in a logical address sequence.

19. The operating method of claim 11, wherein:

the first map data comprise logical to physical information corresponding to a data storage to the first memory block; and the second map data comprise physical to logical information corresponding to the data storage to the first memory block.

20. The operating method of claim 11, further comprising:

checking logical information and physical information on read data corresponding to a read command received from the host, through the segment list; and reading the read data from the first memory block, using the checked logical information and physical information.

* * * * *